US008547316B2

(12) United States Patent
Doi et al.

(10) Patent No.: US 8,547,316 B2
(45) Date of Patent: Oct. 1, 2013

(54) DISPLAY APPARATUS

(75) Inventors: Yusuke Doi, Kanagawa (JP); Tomoro Yoshinaga, Kanagawa (JP); Naoki Ando, Kanagawa (JP); Seisan Hoshimoto, Kanagawa (JP); Kouji Tada, Kanagawa (JP); Tomoaki Kichimi, Kumamoto (JP); Koichi Katagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1430 days.

(21) Appl. No.: 12/197,392

(22) Filed: Aug. 25, 2008

(65) Prior Publication Data

US 2009/0058763 A1 Mar. 5, 2009

(30) Foreign Application Priority Data

Aug. 30, 2007 (JP) ................................. 2007-224706

(51) Int. Cl.

| | |
|---|---|
| ***G09G 3/36*** | (2006.01) |
| ***G09G 3/06*** | (2006.01) |
| ***G09G 5/00*** | (2006.01) |
| ***G06F 3/038*** | (2013.01) |

(52) U.S. Cl.

USPC ................... 345/99; 345/55; 345/87; 345/98; 345/100; 345/204

(58) Field of Classification Search

USPC ............................................. 345/87, 98–100

See application file for complete search history.

(56) References Cited

U.S. PATENT DOCUMENTS

| | | | | |
|---|---|---|---|---|
| 5,250,931 | A * | 10/1993 | Misawa et al. ................ | 345/206 |
| 2004/0021627 | A1 * | 2/2004 | Maki ............................... | 345/89 |

FOREIGN PATENT DOCUMENTS

| | | | |
|---|---|---|---|
| JP | 05-196914 | | 8/1993 |
| JP | 10-222131 | | 8/1998 |
| JP | 11-024632 | * | 1/1999 |
| JP | 2001-222266 | | 8/2001 |
| JP | 2002-116739 | | 4/2002 |
| JP | 2002-268612 | | 9/2002 |
| JP | 2005-121767 | | 5/2005 |
| JP | 2005-292387 | | 10/2005 |
| JP | 2006-301166 | | 11/2006 |

OTHER PUBLICATIONS

Japanese Office Action issued on Jun. 26, 2012, in connection with counterpart JP Application No. 2007-224706.

Japanese Office Action issued on Apr. 17, 2012 in connection with counterpart JP Application No. 2007-224706.

* cited by examiner

*Primary Examiner* — Sumati Lefkowitz
*Assistant Examiner* — David Tung
(74) *Attorney, Agent, or Firm* — Dentons US LLP

(57) ABSTRACT

A display apparatus includes a display panel, a panel substrate including a data line driver, a controller connected to the panel substrate, and a connection unit provided in the panel substrate. The controller selects M signal lines from N signal lines (M is a natural number satisfying M≤N) in accordance with a frame rate of a video data, and transmits M-phase video data to the panel substrate via the selected M signal lines. The data line driver controls the switching circuits of the connection unit in accordance with the frame rate of the video data to connect the M signal lines via which the video data is transmitted, to the data lines, and sequentially selects the M data lines to supply each piece of the video data transmitted via the M signal lines to each pixel connected to the selected M data lines.

8 Claims, 7 Drawing Sheets

| | INTRA-FRAME CLK COUNT NUMBER | | |
|---|---|---|---|
| | 4 | 5-8 | 9 |
| Vcom CORRECTION COEFFICIENT | 0.9 | 1 (DEFAULT) | 1.1 |
| CORRECTED $\gamma$ VALUE | $\gamma$ TABLE 1 | $\gamma$ TABLE 2 | $\gamma$ TABLE 3 |

DISPLAY APPARATUS

CROSS-REFERENCE TO RELATED APPLICATIONS

The present application claims benefit of priority of Japanese patent Application No. 2007-224706 filed in the Japanese Patent Office on Aug. 30, 2007, the entire disclosure of which is incorporated herein by reference.

BACKGROUND OF THE INVENTION

1. Field of the Invention

The present invention relates to a display apparatus equipped with a panel substrate having a panel, a so-called active matrix type display panel, composed of a plurality of pixels connected to cross points between a plurality of data lines disposed successively along one direction and a plurality of gate lines disposed successively along another direction.

2. Description of Related Art

A display panel for displaying images by an active matrix scheme has gate lines each having a switch for selecting pixels in a horizontal line and data lines for writing video data from a vertical direction. Each data line is connected via a data line driver to a signal line over which video data is transmitted from a control driver. The data line driver selects a data line to which video data to be transmitted via the signal line is supplied.

A display apparatus including the display panel constructed as above, for example, a direct-view type liquid crystal display panel using amorphous silicon, has one data line corresponding to one signal line.

In contrast, a gate line driver for controlling selection of a gate line and the above-described data line driver can be assembled in a liquid crystal display panel using low temperature polysilicon, high temperature polysilicon, or single crystal silicon, or in an organic EL display panel. In the display panel assembled with these drivers, video data transmitted by one signal line via the data line driver can be distributed to a plurality of data lines. With this display panel, pieces of video data corresponding in number to the number of signal lines can be written at the same time in pixels connected to the data lines.

In the display panel having the structure described above, techniques for mitigating degradation of visual characteristics such as motion blur inherent to moving image display are widely used in recent years, which the number of frame rewrite operations per unit time of a display apparatus is increased, so that forward and backward frame images in a time axis direction is interpolated into each increased frame or a black image plane is inserted to each increased frame.

Consequently, there is a tendency that a frame rate representative of the number of frames to be rewritten per one second is changed from an existing 60 fps to 120 fps or higher for a display panel of an active matrix type or the like such as a liquid crystal display panel and an organic EL display panel including a transmission type and a reflection type. In the following, the existing 60 fps driving scheme is called a 60 Hz driving scheme, and a driving scheme not lower than 120 fps is called a high frame rate (HFR) driving scheme.

Since there are demands for display panels of both the 60 Hz driving scheme and HFR driving scheme, an issue arises in the necessity of developing the display panels compatible with both the 60 Hz driving scheme and HFR driving scheme independently.

One approach to operating a display panel designed for driving schemes according to a plurality of frame rates is to increase twice of the number of already-existing data line drivers of the 60 Hz driving scheme in order to make compatible with the HFR driving scheme or to switch an operation frequency at two stages for already-existing data line drives. This approach is, however, difficult to be achieved in terms of cost.

As an approach to operating a display panel designed for a plurality of driving schemes having different consumption powers at the same frame rate, for example, Japanese Unexamined Patent Application Publication No. 2001-222266 describes a display apparatus which achieved a reduction in a consumption power by switching display areas by using K gate lines among N gate lines for a displaying state, and by using remaining (N-K) data lines for a non-displaying state.

SUMMARY OF THE INVENTION

The present invention addresses the above-described circumstances, and is directed to provide a display apparatus capable of driving a display panel at a plurality of frame rates.

In accordance with an embodiment of the present invention, there is provided a display apparatus for displaying an image represented by an externally inputted video data, which includes a display panel, a panel substrate, a controller, and a connection unit. The display panel includes a plurality of pixels connected to cross points between a plurality of data lines disposed successively in a first direction and a plurality of gate lines disposed successively in a second direction. The panel substrate includes a data line driver for sequentially selecting the data lines of the display panel and supplying video data to pixels connected to the selected data lines. The controller is connected to the panel substrate via signal lines having N in total (N is a natural number) for selecting M signal lines from the N signal lines (M is a natural number satisfying M≤N) in accordance with a frame rate of the video data and transmitting M-phase video data to the panel substrate via the selected M signal lines. The connection unit is provided in the panel substrate and connects the data line to each of N signal lines connected to the control means via switching circuits. The data line driver controls the switching circuits of the connection unit in accordance with the frame rate of the video data to connect the M signal lines via which the video data is transmitted, to the data lines, and sequentially selects the M data lines disposed successively in the first direction of the display panel to supply each piece of the video data transmitted via the M signal lines to each of pixels connected to the selected M data lines.

According to one embodiment of the present invention, the data line driver controls the switching circuits of the connection unit in accordance with a frame rate of video data to connect M signal lines via which video data is transmitted, to the data lines, sequentially selects M data lines disposed successively in one direction of the display panel to supply each piece of video data transmitted via the M signal lines to each of pixels connected to the selected M data lines. It is therefore possible to drive the display panel at a plurality of frame rates.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

Embodiments of the present invention will be described in detail with reference to the accompanying drawings.

A display apparatus employing an embodiment of the present invention is a display apparatus which includes a panel substrate having a display panel, a so-called active matrix type display panel, composed of pixels connected to cross points between data lines disposed successively along one direction and gate lines disposed successively along another direction. In the following, the embodiments will be described by using a liquid crystal display device 1 such as shown in FIG. 1 as an example of the display apparatus of the type described above.

Figure 1:
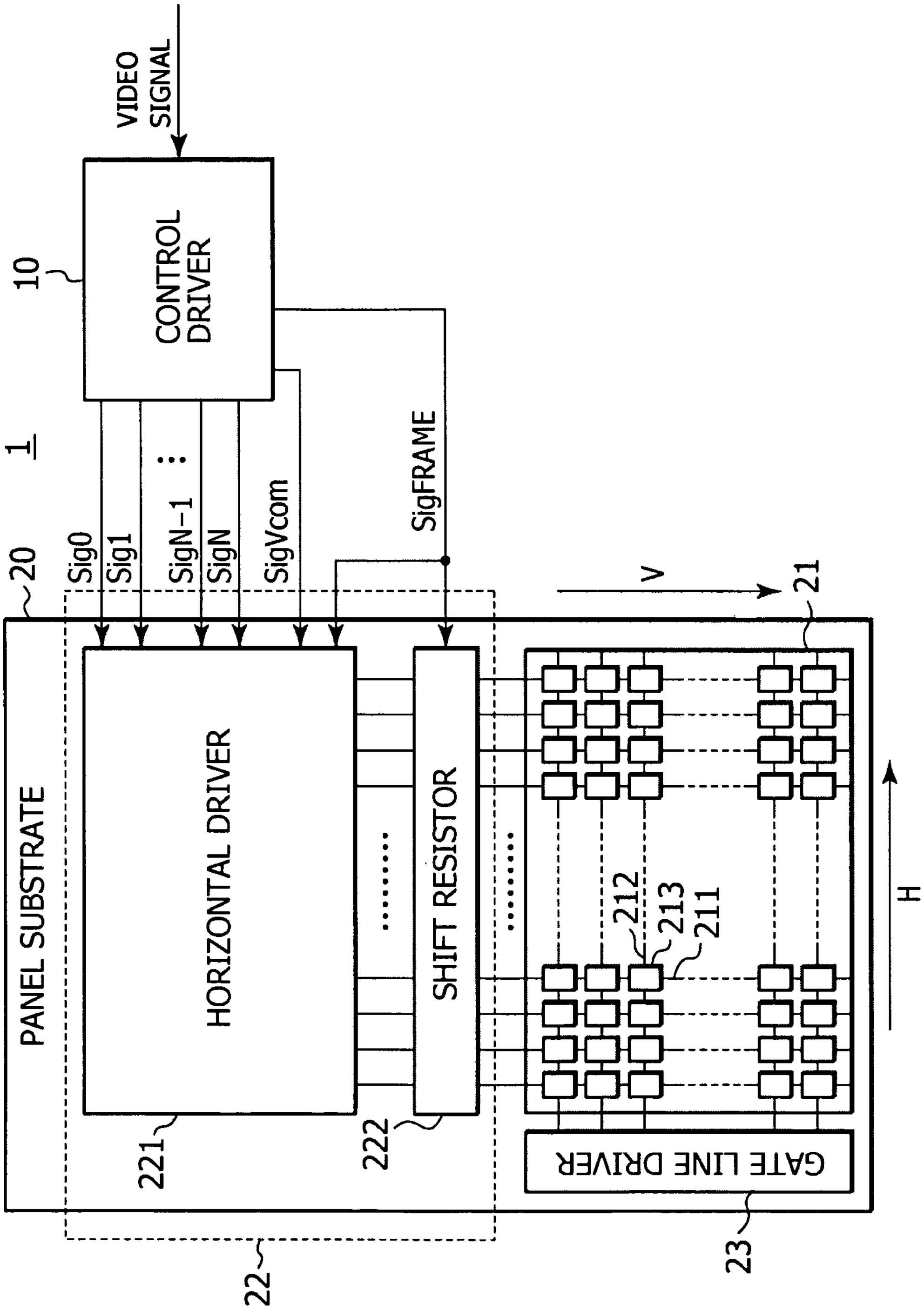
FIG. 1 is a diagram showing the overall structure of a liquid crystal display device employing an embodiment of the present invention.

The liquid crystal display device 1 includes a liquid crystal display panel for displaying an image by applying voltage to liquid crystal held between opposing substrates and driving the panel, and as shown in FIG. 1 has a control driver 10 as a controller for performing predetermined video signal processing for an externally inputted video signal. The liquid crystal display device 1 includes a panel substrate 20 mounted on which are: a display panel 21 composed of a plurality of pixels 213 connected to cross points between a plurality of data lines 211 disposed successively in a horizontal direction H and a plurality of gate lines 212 disposed successively in a vertical direction V; a data line driver 22 for controlling an image data writing to each of the pixels 213 connected to each data line 211 of the display panel 21; and a gate line driver 23 for controlling a selection of each gate line 212.

Figure 2:
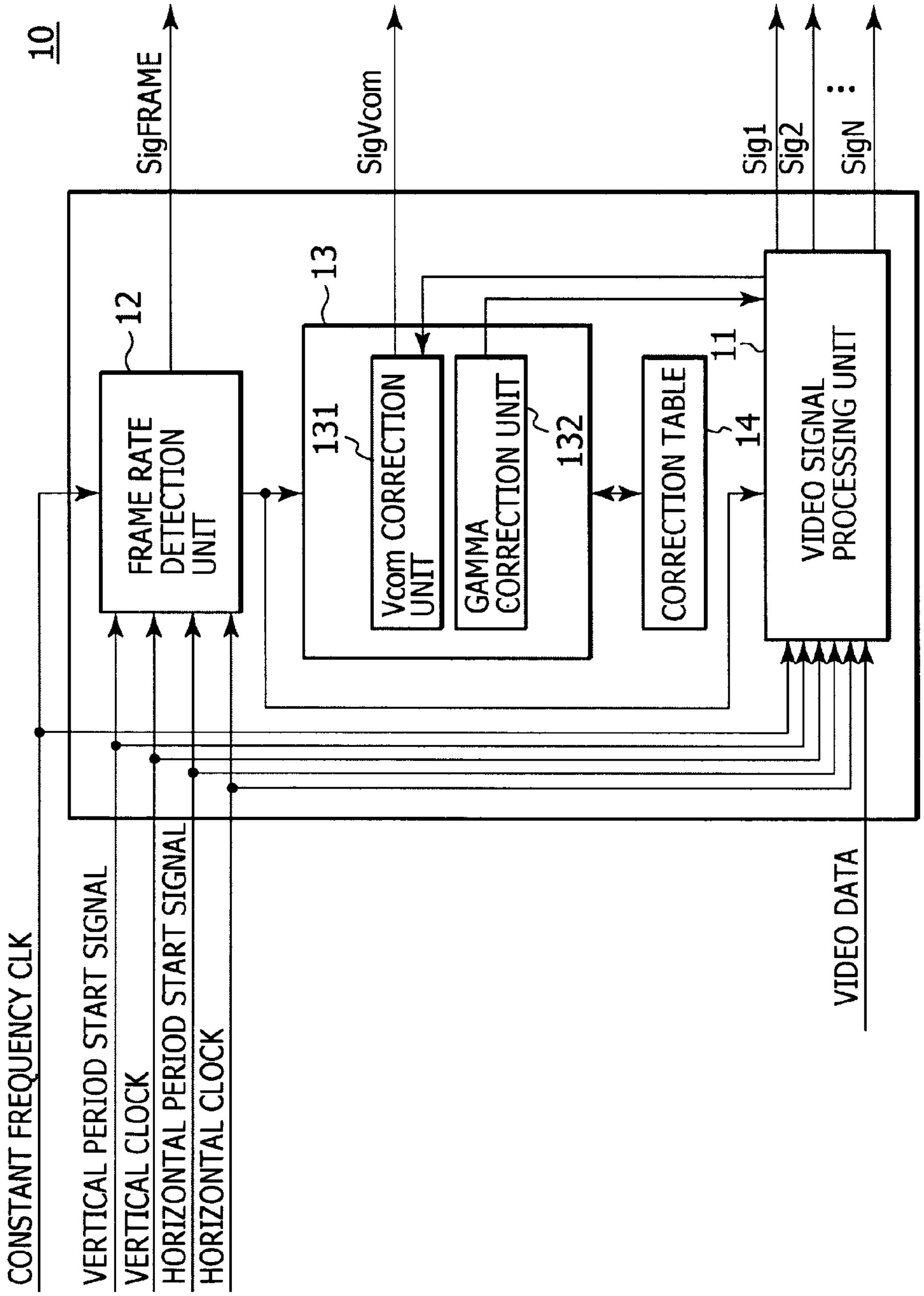
FIG. 2 is a block diagram showing the structure of each processing unit equipped in a control driver.

The control driver 10 is electrically connected to the panel substrate 20 via signal lines Sig1 to SigN the number of which is N in total, where N is a natural number, for transmitting video data, a signal line SigVcom for transmitting a signal representative of a counter electrode voltage (common electrode voltage) Vcom to be described later, and a signal line SigFRAME for transmitting a signal representative of a frame rate FRAME of video data. To supply each signal via each signal line to the panel substrate 20, the control driver 10 includes: as shown in FIG. 2, a video signal processing unit 11 for generating video data by performing a predetermined video signal processing of video data of an externally inputted video signal; a frame rate detecting unit 12 for detecting a frame rate of video data from a signal indicative of a display timing of an externally inputted video signal; a correction unit 13 for correcting a signal to be transmitted to the panel substrate 20, in accordance with a frame rate detected by the frame rate detecting unit 12; and a correction table 14 storing data to be referred to by the correction unit 13 for a correction process.

By using video data of an externally inputted video signal, a constant frequency clock (CLK) synchronous with the video data, a vertical period start signal indicative of a display timing of video data constituting one frame, a vertical clock as a reference clock of the vertical period start signal, a horizontal period start signal indicative of a display timing of video data disposed successively on a scan line in the same frame, and a horizontal clock as a reference clock of the horizontal period start signal, the video signal processing unit 11 generates a plurality of pieces of video data for driving each of the pixels 213, and outputs the generated video data to the signal lines Sig1 to SigN. Specifically, the video signal processing unit 11 selects signal lines Sig1 to SigM the number of which is M in total (M is a natural number satisfying M≤N) from signal lines Sig1 to SigN the number of which is N in total, connected to the panel substrate, in accordance with a frame rate detected by the frame rate detecting unit 12 to be described later, and transmits M-phase video data to the panel substrate via the selected M signal lines Sig1 to SigM.

The video signal processing unit 11 also generates the counter electrode voltage Vcom representative of a reference voltage signal of video data to be supplied to the pixels 213 formed in the display panel 21. The video signal processing unit 11 supplies the generated counter electrode voltage Vcom to the correction unit 13.

Figure 3:
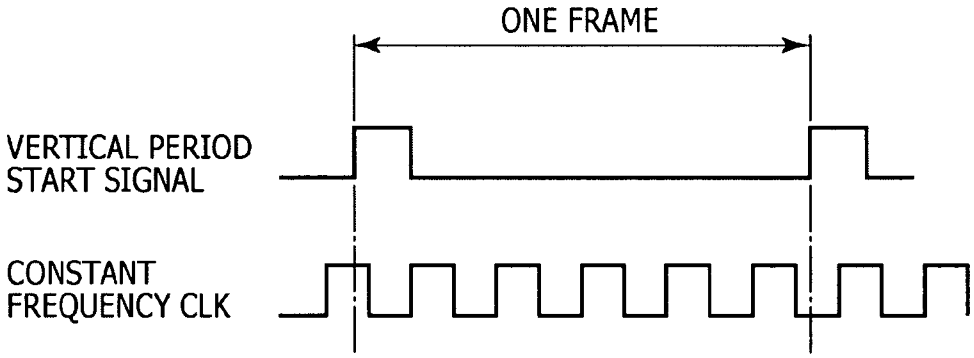
FIG. 3 is a diagram illustrating a frame rate detecting process to be performed by a frame rate detecting unit.

The frame rate detecting unit 12 is supplied with the constant period CLK, a vertical period start signal, a vertical clock, a horizontal period start signal, and a horizontal clock, and detects a frame rate of a video signal from the vertical period start signal and the constant period CLK, for example, in the manner shown in FIG. 3. Namely, the frame rate detecting unit 12 counts the number of constant period CLKs contained in one period of the vertical period start signal to detect a frame rate, and supplies the detected number of clocks to the video signal processing unit 11 and the correction unit 13, as information on the frame rate. The number of constant period CLKs contained in one period of the vertical period start signal increases as the frame rate becomes high.

The correction unit 13 includes a Vcom correction unit 131 and a gamma correction unit 132. The Vcom correction unit corrects a counter electrode voltage value Vcom in accordance with the frame rate detected by the frame rate detecting unit 12. The gamma correction unit 132 corrects correcting video data to correct a gamma value.

In accordance with the frame rate, i.e., the number of constant frequency CLKs detected by the frame rate detecting unit 12, the Vcom correction unit 131 refers to a coefficient for correcting the counter electrode voltage value Vcom supplied from the video signal processing unit 11, from a correction table 14, and multiplies this coefficient by the counter electrode voltage value Vcom supplied from the video signal processing unit 11 to correct the counter electrode voltage value.

Figures 4A, 4B:
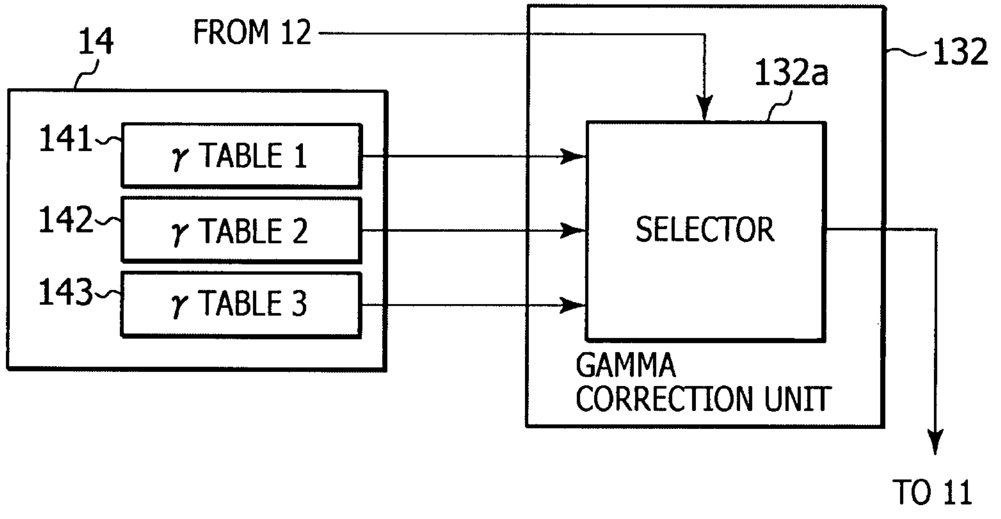
FIG. 4A is a diagram explaining Vcom correction coefficients and gamma correction tables set to a correction table.
FIG. 4B is a block diagram showing the specific structure of a gamma correction processing unit.

For example, as shown in FIG. 4A, the correction table 14 stores 0.9 as a Vcom correction coefficient corresponding to a count value of 1 to 4, 1 as a reference value of a Vcom correction coefficient corresponding to a count value of 5 to 8, and 1.1 as a Vcom correction coefficient corresponding to a count value not smaller than 9. By referring to the Vcom correction coefficient stored in the correction table 14, the Vcom correction unit 131 corrects the counter electrode voltage value Vcom to make it higher as the number of counts, i.e., the frame rate, becomes higher.

The Vcom correction unit 131 supplies the corrected counter electrode voltage value Vcom to the panel substrate 20 via the signal line SigVcom.

The main reason for performing this correction process is as follows. Namely, in the panel substrate 20, as the substrates of the liquid crystal panel are subjected to direct current driving, the liquid crystal is deteriorated. In order to prevent this deterioration, video data with the polarity that is reversed for each frame is written in the pixels 213 during driving, by using as a reference the counter electrode voltage value Vcom supplied from the control driver 10. In this case, when video data of the same value is supplied to each of the pixels 213, the counter electrode voltage value Vcom is ideally set to the center point between the positive polarity side and negative polarity side. However, the counter electrode voltage value Vcom is set generally to a value deviated toward the positive polarity side or negative polarity side from the center point, because of a difference of characteristics between substrates. Further, if the frame rate changes, a time while supplying video data changes correspondingly. As a result, the transient characteristics with respect to an input signal change. From these reasons, to supply same video data to each of the pixels 213 during driving both the positive polarity side and negative polarity side of the panel substrate 20, the Vcom correction unit 131 raises the counter electrode voltage value Vcom as the frame rate becomes high as in the above-described example, to correct the counter electrode voltage value Vcom in accordance with a frame rate.

In this manner, the Vcom correction unit 131 corrects the counter electrode voltage value Vcom in accordance with a frame rate by referring to the correction table 14. Consequently, a proper video data can be written to each of the pixels 213 independently from the polarity.

In accordance with a frame rate detected by the frame rate detecting unit 12, a gamma correction unit 132 corrects a gamma value of an image of video data generated by the video signal processing unit 11, by using the correction table 14. The video signal processing unit 11 corrects video data by using correction data for a gamma value supplied from the gamma correction unit 132.

For example, as shown in FIG. 4A, the correction table 14 stores a gamma table 141 for corrected gamma values corresponding to a count value of 1 to 4, a gamma table 142 for corrected gamma values corresponding to a count value of 5 to 8, and a gamma table 143 for corrected gamma values corresponding to a count value not smaller than 9.

As shown in FIG. 4B, the gamma correction unit 132 includes a selector 132*a* for selecting one of the gamma tables 141, 142, and 143, and reading a gamma value from the selected gamma table. The selector 132*a* selects the gamma table corresponding to the number of counts supplied from the frame rate detecting unit 12, from the correction table 14, and supplies a gamma value indicated by the selected gamma table to the video signal processing unit 11.

The reason for performing this gamma value correction process is as follows. Namely, in supplying video data to each of the pixels 213 of the panel substrate 20, a video data write time changes with a frame rate. Accordingly, voltage values held in the pixels 213 due to a different frame rate vary, and undesirable variations in average luminance levels of an image may result. In order to correct the variation in average luminance levels of an image caused by a different frame rate, the gamma correction unit 132 corrects a gamma value representative of a reference of a luminance level of video data generated by the video signal processing unit 11, in accordance with a frame rate detected by the frame rate detecting unit 12. In this manner, the gamma correction unit 132 can correct properly an average luminance level of an image to be displayed.

Next, description will be made on the structure and operation of the panel substrate 20 to which each signal is supplied from the control panel driver 10 via each of the signal lines Sig1 to SigN.

The display panel 21 includes a plurality of pixels 213 connected to cross points between a plurality of data lines 211 disposed successively in the horizontal direction H and a plurality of gate lines 212 disposed successively in the vertical direction V. In the display panel 21, the pixels 213 disposed successively in the horizontal direction H to be supplied with video data are selected synchronously with the horizontal period start signal. In the display panel 21, video data is supplied to the selected pixels 213 disposed successively in the horizontal direction H from the data line driver 22 via the data lines 211 to write video data in the selected pixels 213.

The data line driver 22 includes a horizontal driver 221 and a shift register 222. The horizontal driver 221 generates a drive voltage signal corresponding to video data to be supplied to the data line, in accordance with the video data supplied from the control driver 10 via the signal lines and counter electrode voltage value Vcom. The shift register 222 sequentially selects the data lines 211 via which video data generated by the horizontal driver 221 is supplied, from the plurality of data lines 211 disposed successively in the horizontal direction H in the display panel 21.

The horizontal driver 221 generates M-phase drive voltage signals in accordance with M-phase video data supplied from the control driver 10 via the signal lines Sig1 to SigM and counter electrode voltage value Vcom, and in addition includes a connection unit 223 for connecting the N signal lines Sig1 to SigN connected to the control driver 10 to the data lines 211 via a switch circuit group SW, as will be later described. The horizontal driver 221 controls the operation of the connection unit 223 in accordance with a frame rate FRAME supplied from the control driver 10, as will be later described.

The shift register 222 selects sequentially data lines the number of which is M in total, from the data lines 211 disposed successively in the horizontal direction H in the display panel 21, and supplies a drive voltage signal generated by the horizontal driver 221 to each of the pixels 213 via the sequentially selected one of the M data lines 211.

In the liquid crystal display device 1 constructed as above, the data line driver 22 and shift register 222 in the panel substrate 20 perform the following specific operations to drive the display panel 21 and properly display an image represented by video data in accordance with each of a plurality of frame rates. Namely, in the panel substrate 20, a plurality of frame rates are switched to drive the display panel 21. In the following, description will be made on specific examples of displaying images at a plurality of frame rates by using two driving schemes: a driving scheme (hereinafter called a 60 Hz driving scheme) for driving the display panel at a frame rate of 60 fps and a high frame rate driving scheme (hereinafter called an HFR driving scheme) for driving the display panel 21 at a frame rate of 120 fps.

For the 60 Hz driving scheme, it is assumed that the control driver 10 sets "4" as an M value and supplies four-phase video data to the panel substrate 20 via the signal lines Sig1 to Sig4, four lines in total, and that the panel substrate 20 writes video signals each set of four pixels 213 disposed in the horizontal direction, at the same time.

For the HFR driving scheme, it is assumed that the control driver 10 sets "8" as an M value and supplies eight-phase video data to the panel substrate 20 via the signal lines Sig1 to Sig8, eight lines in total, and that the panel substrate 20 writes video data for each set of eight pixels 213 disposed in the horizontal direction, at the same time.

The control driver 10 and data line driver 22 are electrically connected via the signal lines Sig1 to Sig8, eight signal lines in total to properly supply a drive voltage signal to pixels 213 constituting the display panel 21 in accordance with the two driving schemes.

Figure 5:
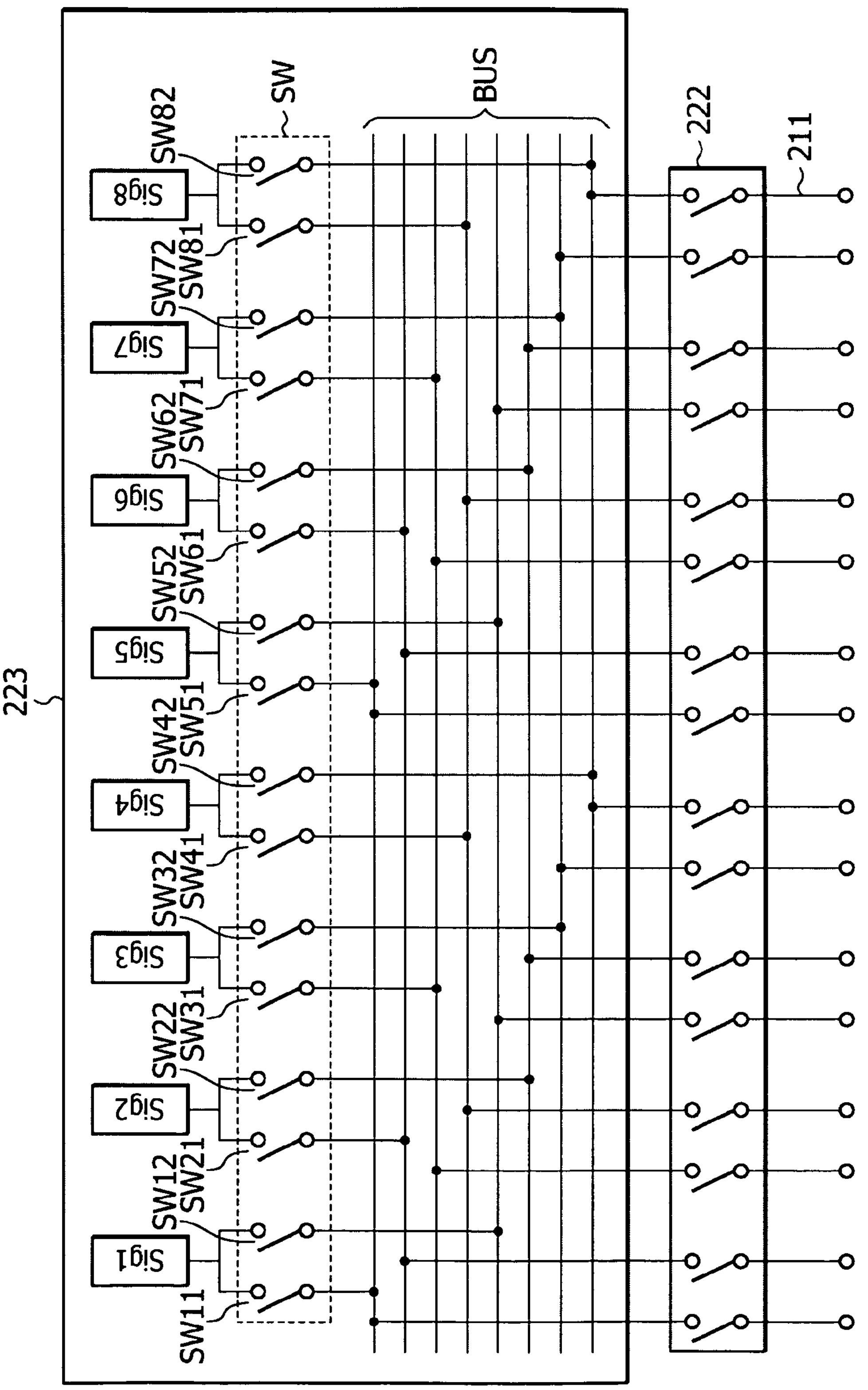
FIG. 5 is a schematic circuit diagram showing the structure of a connection unit of a horizontal driver.

The horizontal driver 221 is provided with a connection unit 223 such as shown in FIG. 5.

Namely, the connection unit 223 includes the switching circuit group SW in which each signal line Sigx (x is an integer from 1 to 8) branched from the signal lines Sig1 to Sig8 connected to the control driver 10 is connected to two switching circuits SWx1 and SWx2. In the connection unit 223, each signal line obtained by branching each signal line Sigx at each set of two switching circuits SWx1 and SWx2 is connected to data lines 211 selected as N, i.e., eight, data lines from the data lines 211 connected to the shift register 222 via a BUS.

Next, with reference to FIG. 6, description will be made on the operations of the horizontal driver 221 and shift register 222 using the 60 Hz driving scheme.

The horizontal driver 221 supplies four-phase video data to be supplied from the control driver 10 to the data lines 211 connected to the shift register 222 by controlling the connection unit 223 in the following manner. Namely, the horizontal driver 221 electrically connects sets of both two switching circuits SWy1 and SWy2 (y is an integer of 1 to 4) connected to four signal lines Sigy to which four-phase video data is supplied from the control driver 10, and does not electrically connect switching circuits SWz1 and SWz2 (z is an integer from 5 to 8) to which video data is not supplied. Namely, the horizontal driver 221 connects the switching circuits so that each-phase video data to be supplied from the control driver 10 is supplied to data lines 211 selected every four data lines from the data lines 211 connected to the shift register 222.

Figure 6:
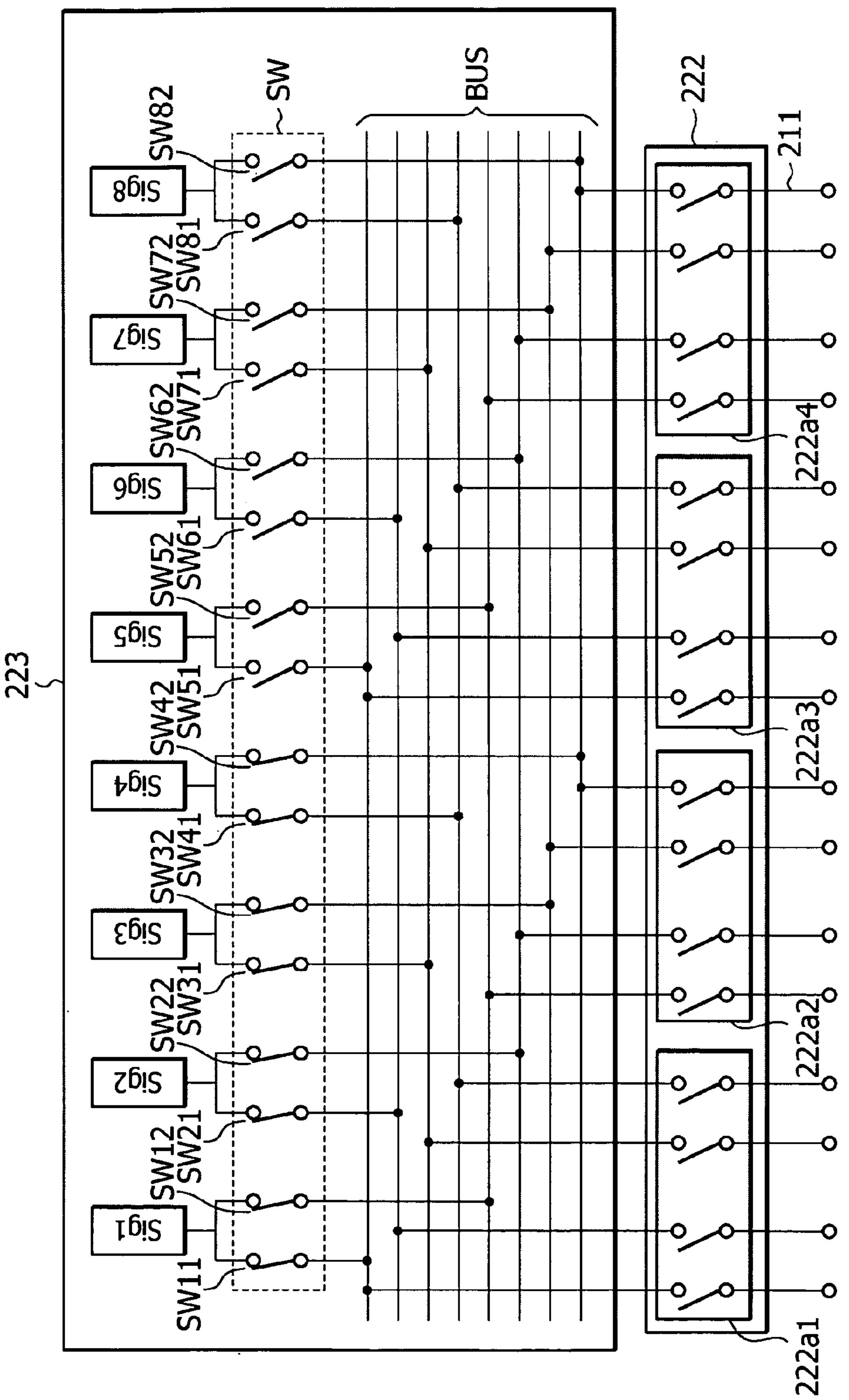
FIG. 6 is a diagram explaining the operations of a horizontal driver and a shift register by a 60 Hz driving scheme.

Then, as shown in FIG. 6, the shift register 222 sequentially connects sets of four switching groups 222*a*1, 222*a*2, 222*a*3, and 222*a*4 to sequentially select data lines 211, four data lines in total, from the data lines 211 of the display panel 21 disposed successively in the horizontal direction, and supplies the drive voltage signal generated by the horizontal driver 221 to each of the pixels 213, via the selected four data lines 211. Since the drive voltage signal corresponding to the same video data is supplied from the horizontal driver 221 to the data lines 211 disposed every four data lines in the horizontal direction, the shift resister 222 switches the data line 211 to be selected, synchronously with the timing when the drive voltage signal is generated.

Next, with reference to FIG. 7, description will be made on the operations of the horizontal driver 221 and shift register 222 using the HFR driving scheme.

The horizontal driver 221 supplies eight-phase video data to be supplied from the control driver 10 to the data lines 211 connected to the shift register 222 by controlling the connection unit 223 in the following manner. Namely, the horizontal driver 221 electrically connects ones switching circuit SWx1 of sets of two switching circuits SWx1 and SWx2 connected to eight signal lines Sigx to which eight-phase video data is supplied from the control driver 10. Namely, the horizontal driver 221 connects the switching circuit group SW so that each-phase video data to be supplied from the control driver 10 is supplied to data lines 211 selected every eight data lines from the data lines 211 connected to the shift register 222.

Figure 7:
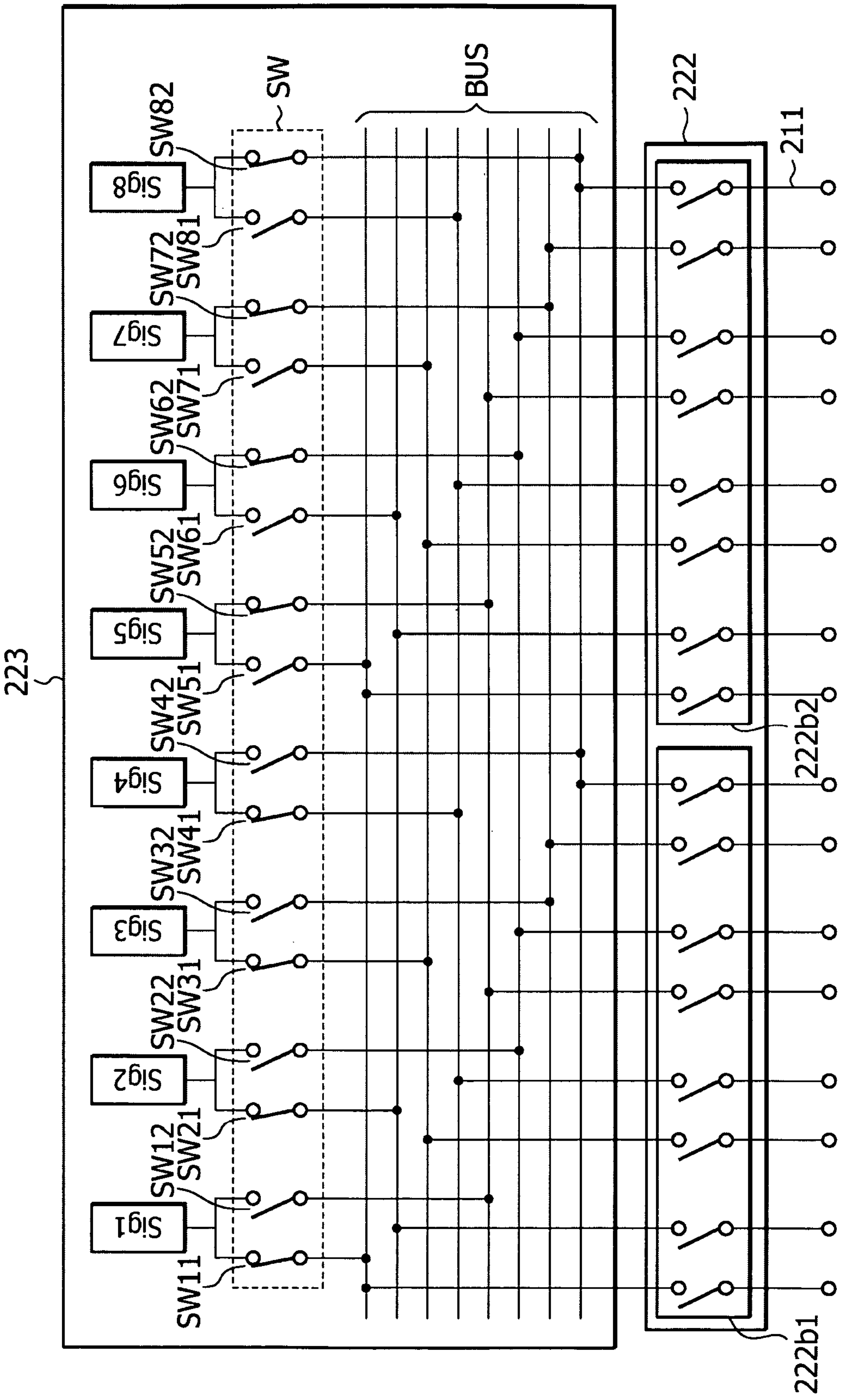
FIG. 7 is a diagram explaining the operations of the horizontal driver and shift register by an HFR driving scheme.

As shown in FIG. 7, the shift register 222 sequentially connects sets of eight switching groups 222*b*1 and 222*b*2 to sequentially selects data lines 211, eight data lines in total, from the data lines 211 of the display panel 21 disposed successively in the horizontal direction H, and supplies the drive voltage signal generated by the horizontal driver 221 to each of the pixels 213, via the selected eight data lines 211.

In the manner described above, the horizontal driver 221 in the panel substrate 20 connects M signal lines Sig1 to SigM via which video data is transmitted, to a plurality of data lines 211 connected to the shift register 222, by controlling the switching circuit group SW of the connection unit 223 in accordance with the video frame rate. The shift register 222 sequentially selects M data lines 211 of the display panel 21 disposed successively in the horizontal direction H, and supplies the video data to be transmitted from the control driver 10 via M signal lines Sig1 to SigM to each of the pixels 213 connected to the selected M data lines 211. It is therefore possible to drive the display panel 21 in accordance with the above-described two frame rates.

It is not necessary to use sets of two switching circuits SWy1 and SWy2 of the switching circuit group SW of the connection unit 223 to be connected to the signal lines Sigy and used only by the HFR driving scheme, but it is possible to use only ones of switching circuits of the switching group SW in order to supply eight-phase video data supplied from the signal lines Sig to the data lines connected to the shift register 222. However, if the switching circuit group SW is made to have the structure that sets of two switching circuits SWy1 and SWy2 are provided for the signal lines Sigy to be used by both the two driving schemes and one switching circuit SWz1 is used for each signal line Sigz used only by the HFR driving scheme, an unfavorable variation in parasitic capacitances may result because of a difference between the numbers of switching circuits. Therefore, the connection unit 223 includes the switching circuit groups SW allowing all signal lines to be connected to the same number of switching circuits to suppress the variation in parasitic capacitances and supply proper video data to each data line 211 connected to the shift register 222.

Further, in the above-described specific examples, although the liquid crystal display device 1, which switches two frame rates, has been described, the number of frame rates, frame rates the number of which is K in total (K is a natural number satisfying K≤N) may be switched. This case may be achieved the connection unit 223 constructed in the following manner.

Namely, the connection unit 223 branches each of signal lines connected to the control driver 10 into K signal lines in total, connects the branched signal lines to the data lines disposed every N data lines in the horizontal direction, via the switching circuits, and supplies the video data supplied from the control driver 10 via each signal line to the data lines disposed every N/K data lines in the horizontal direction. In correspondence with the connection unit 223 constructed in this manner, the horizontal driver 221 electrically connects L switching circuits among K switching circuits connected to the connection unit 223 for each signal line, in accordance with the frame rate of the video data, to video data to be transmitted via M signal lines satisfying N/M=L (L is a natural number), sequentially selects the M data lines 211 disposed successively in the horizontal direction of the display panel, and supplies each video data to be transmitted via the M signal lines to each of pixels 213 connected to the selected M data lines.

By structuring the data line driver 22 in this manner, the liquid crystal display device 1 may drive the display panel 21 in accordance with an arbitrarily selected L-th frame rate from first to K-th frame rates in the order of slower frame rates.

Since the liquid crystal display device 1 may drive the display panel 21 in correspondence with a plurality of frame rates, it is possible to quickly deal with demands for various frame rates and to develop the panel more easily than a known method.

In the foregoing, although a display device employing the present invention has been described by using the liquid crystal display device 1, the present invention is not limited to a liquid crystal display panel. For example, the present invention may be applied to an organic EL panel in which two substrates with electrodes are disposed facing each other, organic substance is held between the opposing substrates, and a drive voltage is applied across the held organic substance.

It should be understood by those skilled in the art that various modifications, combinations, sub-combinations and alternations may occur depending on design requirements and other factors insofar as they are within the scope of the appended claims or equivalents thereof.

What is claimed is:

1. An apparatus for displaying an image represented by an externally inputted video data, comprising:

a display panel including a plurality of pixels connected to cross points between a plurality of data lines disposed successively in a first direction and a plurality of gate lines disposed successively in a second direction;

a panel substrate including a data line driver configured to sequentially select the data lines of the display panel and supply video data to pixels connected to the selected data lines;

control means connected to the panel substrate via signal lines having N in total where N is a natural number, and configured to select M signal lines from the N signal lines in accordance with a frame rate of the video data, and transmit M-phase video data to the panel substrate via the selected M signal lines, M being a natural number satisfying M≤N; and connecting means, provided in the panel substrate, and configured to connect the data lines to the N signal lines connected to the control means via switching circuits, wherein, the data line driver (a) controls the switching circuits of the connecting means, in accordance with the frame rate of the video data to connect the M signal lines via which the video data is transmitted, to the data lines, and (b) sequentially selects the M data lines disposed successively in the first direction of the display panel to supply each piece of the video data to be transmitted through the M signal lines to each of pixels connected to the selected M data lines, M is set to 8 for N≥8, when driving the display panel at a frame rate of 120 fps, and M is set to 4 for N≥8, when the display panel is driven at a frame rate of 60 fps.

2. The apparatus of claim 1, wherein:

the connecting means is composed of a plurality of the switching circuits formed on the panel substrate so that each of the signal lines connected to the control means branches into signal lines having K in total where K is a natural number satisfying K≤N, and connects the branched signal lines to the data lines disposed every N data lines in the first direction, via the switching circuits, respectively, so as to supply the video data supplied via each signal line connected to the control means to the data lines disposed every N/K data lines in the first direction; and the data line driver (a) electrically connects L switching circuits among K switching circuits connected to the connecting means for each signal line, in accordance with the frame rate of the video data, to video data to be transmitted through M signal lines satisfying N/M=L where L is a natural number satisfying L≤K, (b) sequentially selects the M data lines disposed successively in the first direction of the display panel, and (c) supplies each piece of the video data to be transmitted via the M signal lines to each of pixels connected to the selected M data lines.

3. The apparatus of claim 1, wherein:

the display panel includes the data lines disposed successively in a horizontal direction as the first direction; and the control means includes detection means and correction means, wherein, the detection means detects a frame rate of the video data in accordance with a horizontal period start signal indicative of a display timing of the video data disposed in the horizontal direction and a horizontal direction clock signal indicative of a reference clock of the horizontal period start signal, and the correction means corrects, in accordance with the frame rate detected by the detection means, a counter electrode voltage value to be used by the data line driver for generating a drive voltage in response to the video data, the drive voltage being to be supplied to the pixel.

4. The apparatus of claim 1, wherein:

the display panel includes the data lines disposed successively in a horizontal direction as the first direction; and the control means includes detection means and correction means, wherein, the detection means detects a frame rate of the video data in accordance with a horizontal period start signal indicative of a display timing of the video data to be written in the pixels disposed in the horizontal direction and a horizontal direction clock signal indicative of a reference clock of the horizontal period start signal, and the correction means corrects, in accordance with the frame rate detected by the detection means, the video data to correct a gamma value of an image represented by the video data.

5. An apparatus for displaying an image represented by an externally inputted video data, comprising:

a display panel including a plurality of pixels connected to cross points between a plurality of data lines disposed successively in a first direction and a plurality of gate lines disposed successively in a second direction;

a panel substrate including a data line driver configured to sequentially select the data lines of the display panel and supply video data to pixels connected to the selected data lines;

a controller connected to the panel substrate via signal lines having N in total where N is a natural number, and configured to select M signal lines from the N signal lines in accordance with a frame rate of the video data and transmit M-phase video data to the panel substrate via the selected M signal lines, M being a natural number satisfying M≤N; and a connection unit, provided in the panel substrate, and configured to connect the data lines to the N signal lines connected to the controller via switching circuits, wherein, the data line driver (a) controls the switching circuits of the connection unit in accordance with the frame rate of the video data to connect the M signal lines via which the video data is transmitted, to the data lines, and (b) sequentially selects the M data lines disposed successively in the first direction of the display panel to supply each piece of the video data transmitted via the M signal lines to each of pixels connected to the selected M data lines, M is set to 8 for N≥8, when driving the display panel at a frame rate of 120 fps, and M is set to 4 for N≥8, when the display panel is driven at a frame rate of 60 fps.

6. The apparatus of claim 5, wherein:

the connector unit is composed of a plurality of the switching circuits formed on the panel substrate so that each of the signal lines connected to the controller branches into signal lines having K in total where K is a natural number satisfying K≤N, and connects the branched signal lines to the data lines disposed every N data lines in the first direction, via the switching circuits, respectively, so as to supply the video data supplied via each signal line connected to the controller to the data lines disposed every N/K data lines in the first direction; and the data line driver (a) electrically connects L switching circuits among K switching circuits connected to the connector unit for each signal line, in accordance with the frame rate of the video data, to video data to be transmitted through M signal lines satisfying N/M=L where L is a natural number satisfying L≤K, (b) sequentially selects the M data lines disposed successively in the first direction of the display panel, and (c) supplies each piece of the video data to be transmitted via the M signal lines to each of pixels connected to the selected M data lines.

7. The apparatus of claim 5, wherein:

the display panel includes the data lines disposed successively in a horizontal direction as the first direction; and the controller includes a detector and a corrector, wherein, the detector detects a frame rate of the video data in accordance with a horizontal period start signal indicative of a display timing of the video data disposed in the horizontal direction and a horizontal direction clock signal indicative of a reference clock of the horizontal period start signal, and the corrector corrects, in accordance with the frame rate detected by the detector, a counter electrode voltage value to be used by the data line driver for generating a drive voltage in response to the video data, the drive voltage being to be supplied to the pixel.

8. The apparatus of claim 5, wherein:

the display panel includes the data lines disposed successively in a horizontal direction as the first direction; and the controller includes a detector and a corrector, wherein, the detector detects a frame rate of the video data in accordance with a horizontal period start signal indicative of a display timing of the video data to be written in the pixels disposed in the horizontal direction and a horizontal direction clock signal indicative of a reference clock of the horizontal period start signal, and the corrector corrects, in accordance with the frame rate detected by the detector, the video data to correct a gamma value of an image represented by the video data.

* * * * *